United States Patent
Alp et al.

(10) Patent No.: US 8,748,053 B2
(45) Date of Patent: Jun. 10, 2014

(54) ANODE BLEED FLOW DETECTION AND REMEDIAL ACTIONS

(75) Inventors: Abdullah B. Alp, West Henrietta, NY (US); Prasad Gade, Webster, NY (US); Jon R. Sienkowski, Rochester, NY (US)

(73) Assignee: GM Global Technology Operations LLC, Detroit, MI (US)

(*) Notice: Subject to any disclaimer, the term of this patent is extended or adjusted under 35 U.S.C. 154(b) by 2278 days.

(21) Appl. No.: 11/928,608

(22) Filed: Oct. 30, 2007

(65) Prior Publication Data

US 2009/0111000 A1    Apr. 30, 2009

(51) Int. Cl.
*H01M 8/04* (2006.01)

(52) U.S. Cl.
USPC ............ 429/443; 429/410; 429/415; 429/414

(58) Field of Classification Search
USPC .................................. 429/410, 415, 443, 414
See application file for complete search history.

(56) References Cited

U.S. PATENT DOCUMENTS

| | | | |
|---|---|---|---|
| 2007/0072020 A1* | 3/2007 | Arthur et al. ..................... | 429/22 |
| 2007/0207362 A1* | 9/2007 | Koenekamp et al. ............ | 429/34 |
| 2008/0220303 A1* | 9/2008 | Yoshida ........................... | 429/25 |

FOREIGN PATENT DOCUMENTS

WO    WO 2005088755 A1 *   9/2005   ............. H01M 8/04

OTHER PUBLICATIONS

"Flow Calculation for Gases" pdf. 1510 Gateway Dr. NE. East Grand Forks, MN 56721, USA.

* cited by examiner

*Primary Examiner* — Zachary Best
(74) *Attorney, Agent, or Firm* — John A. Miller; Miller IP Group, PLC

(57) ABSTRACT

A system for bleeding the anode side of first and second split fuel cell stacks in a fuel cell system that employs anode flow-shifting, where each split stack includes a bleed valve. The system determines that one or both of the bleed valves is stuck in an open position if there is flow through an orifice and a bleed has not been commanded. A shut-off valve is then used to provide the bleed if the cathode exhaust gas is able to dilute the hydrogen in the bled anode exhaust gas. An outlet valve between the first and second split stacks is used to bleed the anode exhaust gas if the cathode exhaust gas is not significant enough to dilute the hydrogen in the anode exhaust gas. If the first or second bleed valve is stuck in the closed position, then the outlet valve is used to provide the bleed.

19 Claims, 2 Drawing Sheets

ANODE BLEED FLOW DETECTION AND REMEDIAL ACTIONS

BACKGROUND OF THE INVENTION

1. Field of the Invention

This invention relates generally to a system and method for bleeding the anode side of a fuel cell stack and, more particularly, to a system and method for bleeding the anode side of split fuel cell stacks that includes taking remedial actions in the event that a bleed valve has failed in the open or closed position.

2. Discussion of the Related Art

Hydrogen is a very attractive fuel because it is clean and can be used to efficiently produce electricity in a fuel cell. A hydrogen fuel cell is an electro-chemical device that includes an anode and a cathode with an electrolyte therebetween. The anode receives hydrogen gas and the cathode receives oxygen or air. The hydrogen gas is dissociated in the anode to generate free protons and electrons. The protons pass through the electrolyte to the cathode. The protons react with the oxygen and the electrons in the cathode to generate water. The electrons from the anode cannot pass through the electrolyte, and thus are directed through a load to perform work before being sent to the cathode.

Proton exchange membrane fuel cells (PEMFC) are a popular fuel cell for vehicles. The PEMFC generally includes a solid polymer-electrolyte proton-conducting membrane, such as a perfluorosulfonic acid membrane. The anode and cathode typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture and the membrane define a membrane electrode assembly (MEA).

Several fuel cells are typically combined in a fuel cell stack to generate the desired power. For the automotive fuel cell stack mentioned above, the stack may include two hundred or more fuel cells. The fuel cell stack receives a cathode reactant gas, typically a flow of air forced through the stack by a compressor. Not all of the oxygen is consumed by the stack and some of the air is output as a cathode exhaust gas that may include water as a stack by-product. The fuel cell stack also receives an anode hydrogen reactant gas that flows into the anode side of the stack.

A fuel cell stack typically includes a series of bipolar plates positioned between the several MEAs in the stack, where the bipolar plates and the MEAs are positioned between two end plates. The bipolar plates include an anode side and a cathode side for adjacent fuel cells in the stack. Anode gas flow channels are provided on the anode side of the bipolar plates that allow the anode reactant gas to flow to the respective MEA. Cathode gas flow channels are provided on the cathode side of the bipolar plates that allow the cathode reactant gas to flow to the respective MEA. One end plate includes anode gas flow channels, and the other end plate includes cathode gas flow channels. The bipolar plates and end plates are made of a conductive material, such as stainless steel or a conductive composite. The end plates conduct the electricity generated by the fuel cells out of the stack. The bipolar plates also include flow channels through which a cooling fluid flows.

The MEAs are permeable and thus allow nitrogen in the air from the cathode side of the stack to permeate therethrough and collect in the anode side of the stack, referred to in the industry as nitrogen cross-over. Even though the anode side pressure may be slightly higher than the cathode side pressure, cathode side partial pressures will cause air to permeate through the membrane. Nitrogen in the anode side of the fuel cell stack dilutes the hydrogen such that if the nitrogen concentration increases above a certain percentage, such as 50%, the fuel cell stack becomes unstable and may fail. It is known in the art to provide a bleed valve at the anode exhaust gas output of the fuel cell stack to remove nitrogen from the anode side of the stack.

It has been proposed in the art to provide stack order switching or anode flow-shifting in a fuel cell system that employs split stacks. Particularly, valves and plumbing in the system are provided so that the anode exhaust gas exiting a first sub-stack is sent to the anode side of a second sub-stack, and the anode exhaust gas exiting the second sub-stack is sent to the anode side of the first sub-stack in a cyclical manner.

SUMMARY OF THE INVENTION

In accordance with the teachings of the present invention, a system and method are disclosed for bleeding the anode side of split fuel cell stacks in a fuel cell system that employs anode flow-shifting. The fuel cell system includes a first split stack and a second split stack having coupled cathode inlets and coupled cathode outlets. The fuel cell system also includes a first bleed valve coupled to the anode input of the first split stack and a second bleed valve coupled to the anode input of the second split stack. An orifice is provided in fluid communication between the first and second bleed valves and a shut-off valve. A pressure sensing device is provided across the orifice, and provides a pressure measurement indicating flow through the orifice. An outlet valve is provided in a line that couples the anode side of the first and second split stacks.

The system determines that one or both of the bleed valves is stuck in an open position if there is flow through the orifice and an anode side bleed has not been commanded. In this occurrence, the shut-off valve is used to provide the bleed if the cathode exhaust gas is able to dilute the hydrogen in the bled anode exhaust gas. The outlet valve is used to bleed the anode exhaust gas if the cathode exhaust gas is not significant enough to dilute the hydrogen in the anode exhaust gas. If the first or second bleed valve is stuck in the closed position, then the outlet valve is used to provide the anode side bleed.

Additional features of the present invention will become apparent from the following description and appended claims taken in conjunction with the accompanying drawings.

DETAILED DESCRIPTION OF THE EMBODIMENTS

The following discussion of the embodiments of the invention directed to a system and method for providing an anode bleed from split fuel cell stacks in a fuel cell system and taking remedial actions if a bleed valve fails is merely exemplary in nature, and is in no way intended to limit the invention or its applications or uses.

Figure 1:
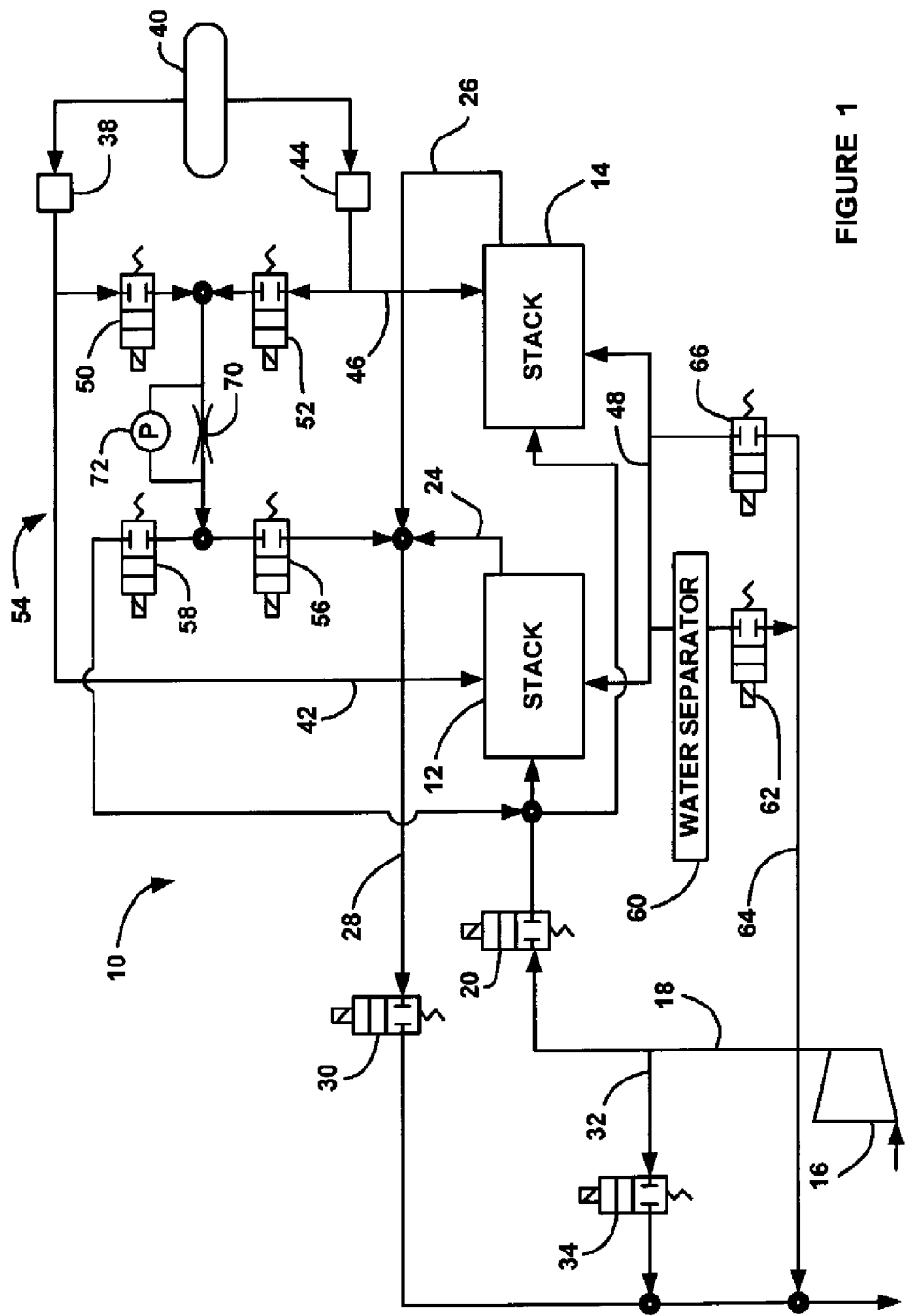
FIG. 1 is a schematic block diagram of a fuel cell system employing split fuel cell stacks and anode flow-shifting.

FIG. 1 is a schematic block diagram of a fuel cell system 10 including a first split fuel cell stack 12 and a second split fuel cell stack 14. A compressor 16 provides cathode input air on cathode input line 18 to the split stacks 12 and 14 through a normally closed cathode input valve 20. The valve 20 may be part of a water vapor transfer unit that humidifies the cathode input air using, for example, the cathode exhaust gas. Such a water vapor transfer unit may include more than one normally closed valve. Cathode exhaust gas is output from the split stack 12 on line 24 and cathode exhaust gas is output from the split stack 14 on line 26 where the cathode exhaust gas from the stacks 12 and 14 is combined into a single cathode output line 28. A normally closed cathode back pressure valve 30 controls the flow of the cathode exhaust gas through the line 28. A cathode by-pass line 32 between the input line 18 and the output line 28 allows the cathode input air to by-pass the stacks 12 and 14. A normally open by-pass valve 34 controls whether the cathode air by-passes the stacks 12 and 14. If the valves 20 and 30 are closed and the valve 34 is open, then air from the compressor 16 will by-pass the stacks 12 and 14.

In this non-limiting embodiment, the split stacks 12 and 14 employ anode flow-shifting where the anode reactant gas flows back and forth through the split stacks 12 and 14 at a predetermined cycle in a manner that is well understood to those skilled in the art. An injector 38 injects hydrogen gas from a hydrogen gas source 40 through anode line 42 to the split stack 12 and an injector 44 injects hydrogen gas from the hydrogen gas source 40 through anode line 46 to the split stack 14 in an alternating sequence. A connector line 48 connects the anode side of the split stacks 12 and 14 to allow the anode gas to flow therebetween.

A water separator 60 is coupled to the connector line 48 and collects water in the anode gas flow between the split stacks 12 and 14. A normally closed drain valve 62 is provided that is periodically opened to vent the water to the cathode exhaust gas line 28 on line 64. Further, an anode exhaust gas purge valve 66 can be provided to fast purge the anode gas to the line 64. The drain valve 62 will generally be a small valve having a small opening.

As discussed above, it is desirable to periodically bleed the anode side of the split stacks 12 and 14 to remove nitrogen from the anode side of the stacks 12 and 14 that may otherwise dilute the hydrogen and affect cell performance. The system 10 includes a bleed module unit (BMU) 54 having normally closed bleed valves 50 and 52 for this purpose. When an anode bleed is commanded, the bleed valve 50 or 52 is opened and the bled anode exhaust gas is sent to the cathode exhaust gas line 28 depending on which direction the anode gas is currently flowing. Particularly, if the hydrogen gas is being injected into the split stack 12 from the source 40 when a bleed is triggered, then the bleed valve 52 is opened. Likewise, if the hydrogen gas is being injected into the split stack 14 from the source 40 when a bleed is triggered, then the bleed valve 50 is opened. The flow-shifting will typically occur several times during a normal bleed duration so that the bleed valves 50 and 52 have to be opened and closed several times in time with the flow-switching.

The BMU 54 also includes a cathode outlet shut-off valve 56 and a cathode inlet shut-off valve 58. An orifice 70 having a known diameter is provided between the bleed valves 50 and 52 and the shut-off valves 56 and 58 in the BMU 54. A differential pressure sensor 72 is coupled across the orifice 70 and provides a pressure indicative of the flow through the orifice 70. Particularly, when the flow through the orifice 70 is zero, then the pressure drop across the orifice 70 is zero. As the flow through the orifice 70 increases during a bleed, the pressure drop across the orifice 70 increases in a nearly linear manner.

During normal fuel cell system operation, when a bleed is commanded, the bleed valves 50 and 52 are opened and closed in sync with the flow-switching, as discussed above. The shut-off valve 58 will typically be closed and the shut-off valve 56 typically will be opened during the bleed so that the bled anode exhaust gas is sent to the cathode output line 28. During stack warm-up at system start-up, it may be desirable to inject some of the anode exhaust gas that includes residual hydrogen into the cathode input of the split stacks 12 and 14. In order to allow the input of the hydrogen exhaust gas, the shut-off valve 58 is opened and the shut-off valve 56 is closed where the bleed valves are opened and closed in time with the flow-shifting. In an alternate embodiment, fresh hydrogen can be injected into the cathode side of the split stacks 12 and 14 to provide combustion for heating the split stacks 12 and 14.

According to the invention, the differential pressure sensor 72 is used to detect whether one or both of the bleed valves 50 or 52 is stuck in an open position, i.e., providing an anode bleed when none is requested, or stuck in a closed position, i.e., not providing the anode bleed when one is requested. The anode bleed flow rate $\dot{n}$ can be detected and estimated using the differential pressure sensor 72 by equation (1) below for sub-critical flow conditions.

$$\dot{n} = \frac{K_v}{4.633} \sqrt{\frac{P_{in}^2 - P_{out}^2}{MW * T}} = \frac{K_v}{4.633} \sqrt{\frac{2P_{out}dP + dP^2}{MW * T}} \qquad (1)$$

Where $K_v$ is a gain, $P_{in}$ is the pressure at the input to the orifice 70, $P_{out}$ is the pressure at the output of the orifice 70, MW is the molecular weight of the anode exhaust gas and T is the temperature of the cooling fluid out of the split stacks 12 and 14.

During critical flow conditions, the anode bleed flow rate $\dot{n}$ can be estimated by equation (2) below.

$$\dot{n} = \frac{K_v}{5.375} \sqrt{\frac{P_{in}^2 - P_{out}^2}{MW * T}} = \frac{K_v}{5.375} \sqrt{\frac{(P_{out} + dP)^2}{MW * T}} \qquad (2)$$

Where, $P_{in}$ $P_{out}$+dP.

If the anode bleed is diverted into the cathode inlet, the cathode inlet pressure is used as pressure $P_{out}$ in equations (1) and (2). If the anode bleed is diverted into the cathode outlet, the cathode outlet pressure is used as pressure $P_{out}$.

Figure 2:
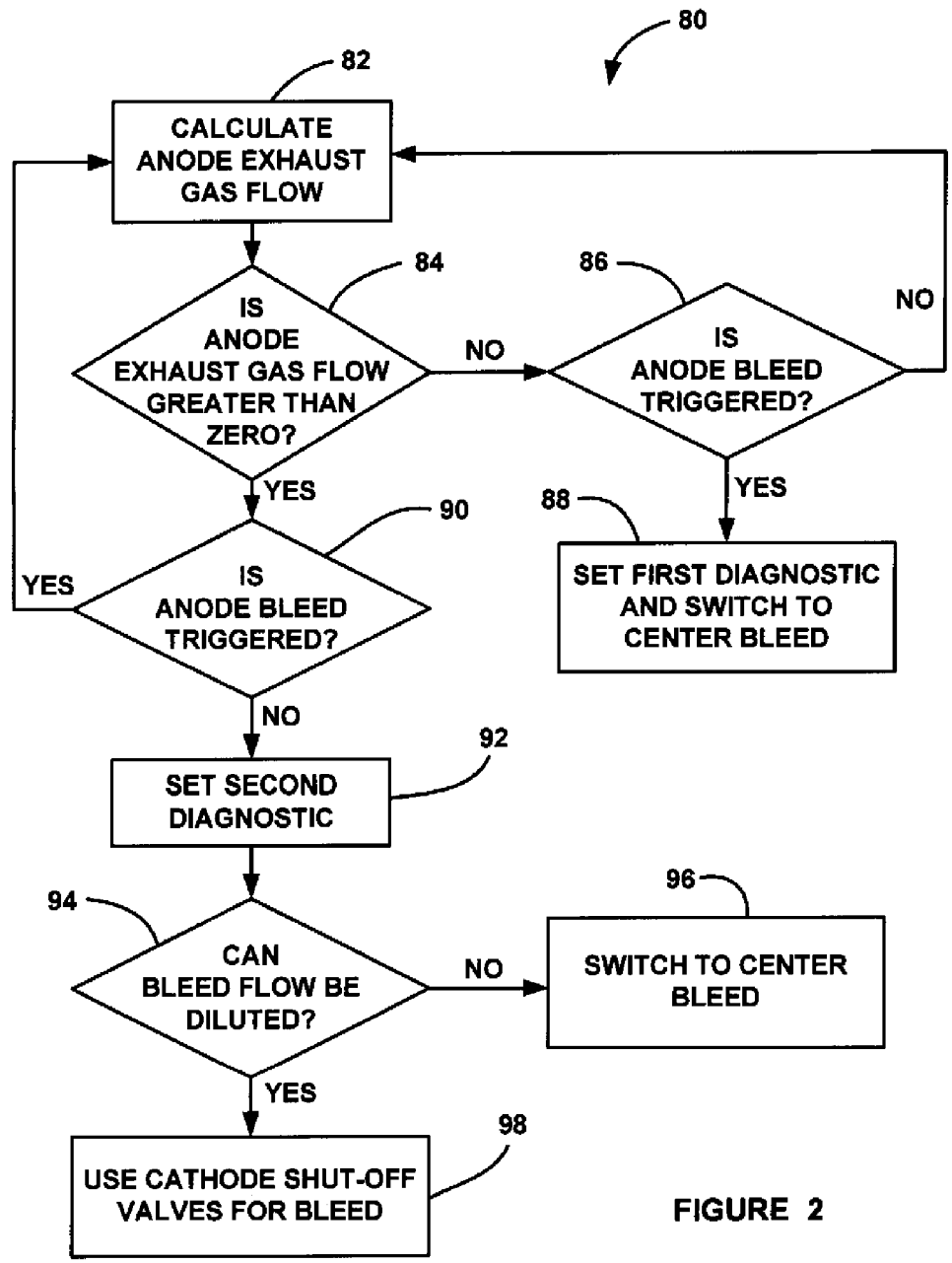
FIG. 2 is a flow chart diagram showing a process for taking remedial action in the event that one of the bleed valves in the fuel cell system shown in FIG. 1 is stuck in the open or closed position, according to an embodiment of the present invention.

FIG. 2 is a flow chart diagram 80 showing a process by which the algorithm that controls the operation of the fuel cell system 10 takes remedial action in the event that the bleed valves 50 or 52 is stuck in an open position or a closed position. The algorithm calculates the hydrogen flow through the orifice 70 at box 82 based on equation (1) or (2) depending whether the flow is in a sub-critical flow condition or a critical flow condition. The algorithm then determines whether the anode exhaust gas flow is greater than zero at decision diamond 84. If the anode exhaust gas flow is not greater than zero at the decision diamond 84, then the algorithm determines whether an anode bleed has been triggered at decision diamond 86. If an anode bleed has not been triggered at the decision diamond 86, the algorithm knows that the anode exhaust gas flow should be zero, and that the bleed valve 50 and 52 are operating properly. The algorithm then returns to the box 82 to calculate the anode exhaust gas flow through the orifice 70.

If the anode exhaust gas flow is not greater than zero at the decision diamond 84 and an anode bleed has been triggered at the decision diamond 86, then the algorithm knows that one or both of the bleed valves 50 and 52 is stuck in the closed position. The algorithm sets the proper diagnostic at box 88 to notify the vehicle operator of the problem. Because the split stacks 12 and 14 will eventually fail as a result of too much nitrogen in the anode side of the split stacks 12 and 14 if the bleed valve 50 or 52 is stuck closed, then another technique has to be used to remove the nitrogen from the anode side of the split stacks 12 and 14 until the bleed valve 50 or 52 can be fixed. In this embodiment, the algorithm controls the drain valve 62 to provide the anode bleed so that the split stacks 12 and 14 can still operate.

If the anode exhaust gas flow is greater than zero at the decision diamond 84, then the algorithm determines whether a bleed has been triggered at decision diamond 90. If a bleed has been triggered at the decision diamond 90, then there should be flow through the orifice 70 and the valves 50 and 52 should be operating properly. The algorithm returns to the box 82 to calculate the anode exhaust gas flow. If an anode bleed has not been triggered at the decision diamond 90, then the algorithm knows that one or both of the bleed valves 50 and 52 is either stuck in an open position or is leaking. The algorithm will then set a second diagnostic at box 92 to notify the vehicle operator of the failed valve.

Because the anode side of the split stack 12 or 14 is now continually emitting anode exhaust as a result of the open or leaky bleed valve, which may include a significant amount of hydrogen, the algorithm determines whether the anode exhaust gas flow can be diluted by the cathode exhaust at decision diamond 94 to provide a low enough concentration of hydrogen in the exhaust where it will not be a safety concern if vented to the environment. Algorithms are known in the art that prevent an anode exhaust gas bleed if the amount of cathode air flowing through the cathode exhaust is not enough to dilute hydrogen that may be in the anode exhaust to below a certain value, such as three percent, where it will not be of a safety concern because of combustion.

If one or both of the bleed valves 50 and 52 is leaking or is stuck open, then the algorithm will either perform the anode bleed using the drain valve 62 or the shut-off valve 56 depending on whether the cathode exhaust gas flow is great enough to dilute the hydrogen in the anode exhaust. During those times when a bleed is requested and the anode exhaust gas cannot be diluted enough, then the small orifice drain valve 62 is used as an outlet valve to perform the bleed at the normal times at box 96. During those times when the anode exhaust gas can be diluted enough, then the shut-off valve 56 is opened to bleed the anode exhaust gas to the line 28.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A fuel cell system comprising:
   a first split stack including a cathode input, a cathode output, an anode input and an anode output;
   a second split stack including a cathode input, a cathode output, an anode input and an anode output, wherein the cathode inputs for the first and second split stacks are coupled together and the cathode outputs from the first and second split stacks are coupled together;
   a first bleed valve coupled to the anode input of the first split stack;
   a second bleed valve coupled to the anode input of the second split stack;
   an orifice in fluid communication with the first and second bleed valves and the coupled cathode outputs of the first and second split stacks; and
   a pressure sensor coupled across the orifice, said pressure sensor providing a pressure measurement indicative of flow through the orifice so as to provide an indication of whether anode exhaust gas is flowing through the first and second bleed valves.

2. The system according to claim 1 further comprising a cathode output shut-off valve coupled in fluid communication between the orifice and the coupled cathode outputs of the first and second split stacks.

3. The system according to claim 1 further comprising a cathode inlet shut-off valve coupled in fluid communication between the orifice and the coupled cathode inputs of the first and second split stacks.

4. The system according to claim 1 further comprising an outlet valve in fluid communication with the anode outputs of the first and second split stacks.

5. The system according to claim 4 wherein the outlet valve is a drain valve for draining water from a water separator.

6. The system according to claim 4 wherein the pressure measurement provides an indication of whether the first or second bleed valve is stuck in an open position or a closed position or whether the first or second bleed valve is leaking based on the flow through the orifice and whether an anode bleed has been triggered.

7. The system according to claim 6 wherein the system uses the outlet valve to provide an anode side bleed for the first split stack and the second split stack if the first bleed valve or the second bleed valve is stuck in a closed position.

8. The system according to claim 6 wherein the system uses the outlet valve to provide the anode side bleed if the first bleed valve or the second bleed valve is stuck in an open position or is leaking, and a cathode exhaust gas flow is not significant enough to dilute the hydrogen in the bled anode exhaust gas.

9. The system according to claim 6 wherein the system uses a cathode output shut-off valve to provide the anode bleed if the first or second bleed valve is stuck in an open position or is leaking, and a cathode exhaust gas flow is significant enough to dilute the hydrogen in the bled anode exhaust gas.

10. The system according to claim 1 wherein the first and second split stacks operate under anode flow-shifting.

11. A fuel cell system comprising:
    a first split stack including a cathode input, a cathode output, an anode input and an anode output;
    a second split stack including a cathode input, a cathode output, an anode input and an anode output, wherein the cathode inputs for the first and second split stacks are coupled together and the cathode outputs from the first and second split stacks are coupled together;
    a first bleed valve coupled to the anode input of the first split stack;
    a second bleed valve coupled to the anode input of the second split stack;
    an orifice in fluid communication with the first and second bleed valves and the coupled cathode outputs of the first and second split stacks;
    a cathode output shut-off valve coupled in fluid communication between the orifice and the coupled cathode outputs of the first and second split stacks;
    an outlet valve in fluid communication with the anode outlets of the first and second split stacks; and
    a pressure sensor coupled across the orifice, said pressure sensor providing a pressure measurement of flow through the orifice so as to provide an indication of whether the first or second bleed valve is stuck in an open position or a closed position or whether the first or second bleed valve is leaking based on the flow through the orifice and whether an anode bleed has been commanded, said system using the outlet valve to provide an anode side bleed for the first split stack and the second split stack if the first bleed valve or the second bleed valve is stuck in a closed position, said system using the outlet valve to provide the anode side bleed if the first bleed valve or the second bleed valve is stuck in an open position or is leaking and a cathode exhaust gas flow is not significant enough to dilute the hydrogen in the bled anode exhaust gas, and said system using the shut-off valve to provide the anode bleed if the first or second bleed valve is stuck in an open position or is leaking and a cathode exhaust gas flow is significant enough to dilute the hydrogen in the bled anode exhaust gas.

12. The system according to claim 11 wherein the first and second split stacks operate under anode flow-shifting.

13. The system according to claim 11 further comprising a cathode inlet shut-off valve coupled in fluid communication between the orifice and the coupled cathode inputs to the first and second split stacks.

14. The system according to claim 11 wherein the outlet valve is a drain valve for draining water from a water separator.

15. A fuel cell system comprising:
   a first split stack including a cathode input, a cathode output, an anode input and an anode output;
   a second split stack including a cathode input, a cathode output, an anode input and an anode output, wherein the cathode inputs for the first and second split stacks are coupled together and the cathode outputs from the first and second split stacks are coupled together;
   a first bleed valve coupled to the anode input of the first split stack;
   a second bleed valve coupled to the anode input of the second split stack;
   an orifice in fluid communication with the first and second bleed valves and the coupled cathode outputs of the first and second split stacks;
   a cathode output shut-off valve coupled in fluid communication between the orifice and the coupled cathode outputs of the first and second split stacks;
   a cathode inlet shut-off valve coupled in fluid communication between the orifice and the coupled cathode inputs to the first and second split stacks;
   an outlet valve in fluid communication with the anode outlets of the first and second split stacks; and
   a pressure sensor coupled across the orifice, said pressure sensor providing a pressure measurement indicative of flow through the orifice, wherein the pressure measurement provides an indication of whether the first or second bleed valve is stuck in an open position or a closed position or whether the first or second bleed valve is leaking based on the flow through the orifice and whether an anode bleed has been triggered.

16. The system according to claim 15 wherein the system uses the outlet valve to provide an anode side bleed for the first split stack and the second split stack if the first bleed valve or the second bleed valve is stuck in a closed position.

17. The system according to claim 15 wherein the system uses the outlet valve to provide the anode side bleed if the first bleed valve or the second bleed valve is stuck in an open position or is leaking, and a cathode exhaust gas flow is not significant enough to dilute the hydrogen in the bled anode exhaust gas.

18. The system according to claim 15 wherein the system uses a cathode output shut-off valve to provide the anode bleed if the first or second bleed valve is stuck in an open position or is leaking, and a cathode exhaust gas flow is significant enough to dilute the hydrogen in the bled anode exhaust gas.

19. The system according to claim 15 wherein the outlet valve is a drain valve for draining water from a water separator.

* * * * *